(12) United States Patent
Tang et al.

(10) Patent No.: US 9,825,546 B2
(45) Date of Patent: Nov. 21, 2017

(54) CIRCUITS AND METHODS FOR AUXILIARY SECONDARY SUPPLY GENERATION WITH SELF-STARTING PRIMARY SIDE DRIVER IN ISOLATED POWER CONVERTERS

(71) Applicant: Infineon Technologies Austria AG, Villach (AT)

(72) Inventors: Benjamim Tang, Rancho Palos Verdes, CA (US); Darryl Tschirhart, Torrance, CA (US); Simone Fabbro, Udine (IT); Giuseppe Bernacchia, Villach (AT); Alan Huang, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/085,154

(22) Filed: Mar. 30, 2016

(65) Prior Publication Data
US 2017/0288556 A1    Oct. 5, 2017

(51) Int. Cl.
*H02M 3/335* (2006.01)
*H02M 1/36* (2007.01)
*H02M 3/337* (2006.01)
*H02M 1/00* (2006.01)

(52) U.S. Cl.
CPC ......... *H02M 3/33546* (2013.01); *H02M 1/36* (2013.01); *H02M 3/3376* (2013.01); *H02M 2001/0045* (2013.01)

(58) Field of Classification Search
CPC .......... H02M 1/36; H02M 2001/0006; H02M 2001/0045
See application file for complete search history.

(56) References Cited

U.S. PATENT DOCUMENTS

| 5,757,627 A  * | 5/1998 | Faulk ................ | H02M 3/33576 363/21.14 |
| 6,456,511 B1 * | 9/2002 | Wong ..................... | H02M 1/36 363/21.13 |
| 8,964,416 B2 * | 2/2015 | Persson ................... | H02M 1/36 363/21.01 |
| 2008/0049452 A1* | 2/2008 | Van Bodegraven .... | H02M 1/36 363/21.01 |
| 2009/0189579 A1* | 7/2009 | Melanson ............. | H02J 7/0054 323/282 |
| 2010/0157630 A1* | 6/2010 | Polivka ............. | H02M 3/33523 363/21.16 |

(Continued)

*Primary Examiner* — Yusef Ahmed
(74) *Attorney, Agent, or Firm* — Murphy, Bilak & Homiller, PLLC (57) ABSTRACT

Circuits that provide an auxiliary power supply on the secondary side of an isolated switched-mode power converter are described. Such an auxiliary supply may be used to provide power to a secondary side controller or to other circuitry in the secondary side of the power converter. During at least a start-up phase of the power converter, the secondary side auxiliary power supply is supplied power by use of a self-starting primary side driver that operates autonomously until the secondary side controller is fully operational. Circuits and methods for such a self-starting primary side driver are provided. The techniques disclosed provide for a secondary side auxiliary power supply that uses minimal additional circuitry.

12 Claims, 10 Drawing Sheets

(56) References Cited

U.S. PATENT DOCUMENTS

| | | | | |
|---|---|---|---|---|
| 2010/0327765 A1* | 12/2010 | Melanson | ........... | H02M 3/3374 |
| | | | | 315/291 |
| 2012/0081927 A1* | 4/2012 | Matsumoto | ....... | H02M 3/33523 |
| | | | | 363/21.05 |
| 2012/0243271 A1* | 9/2012 | Berghegger | ...... | H02M 3/33507 |
| | | | | 363/21.15 |
| 2013/0155728 A1* | 6/2013 | Melanson | ............... | H02M 1/44 |
| | | | | 363/21.16 |
| 2014/0028095 A1* | 1/2014 | Maru | ................ | H02M 3/33523 |
| | | | | 307/31 |
| 2014/0112030 A1* | 4/2014 | Fahlenkamp | ..... | H02M 3/33507 |
| | | | | 363/21.14 |
| 2014/0126254 A1* | 5/2014 | Al-Shyoukh | ........... | G05F 1/468 |
| | | | | 363/49 |
| 2015/0280573 A1* | 10/2015 | Gong | ................ | H02M 3/33523 |
| | | | | 363/21.14 |
| 2015/0280576 A1* | 10/2015 | Hinz | ................. | H02M 3/33507 |
| | | | | 363/21.15 |
| 2015/0280584 A1* | 10/2015 | Gong | ................ | H02M 3/33515 |
| | | | | 363/21.13 |
| 2016/0141964 A1* | 5/2016 | Yu | ..................... | H02M 3/33507 |
| | | | | 363/21.02 |
| 2016/0358705 A1* | 12/2016 | Lin | ........................ | H01F 27/06 |
| 2016/0359421 A1* | 12/2016 | Lin | ................... | H02M 3/33592 |
| 2017/0033703 A1* | 2/2017 | Kikuchi | ............ | H02M 3/33592 |
| 2017/0155335 A1* | 6/2017 | Chang | ................ | H02M 3/33592 |

\* cited by examiner

CIRCUITS AND METHODS FOR AUXILIARY SECONDARY SUPPLY GENERATION WITH SELF-STARTING PRIMARY SIDE DRIVER IN ISOLATED POWER CONVERTERS

TECHNICAL FIELD

The present application relates to circuits and methods for providing an auxiliary power supply on the secondary side of an isolated switched-mode power converter.

BACKGROUND

Switched-mode power converters are widely used for efficiently converting an input direct-current (DC) voltage into an output power supply at a different voltage level. Switched-mode power converters are often used as alternatives to linear regulators, but have the advantage of being able to step a voltage up or down. Additionally, switched-mode power converters are significantly more efficient than linear regulators, as linear regulators waste considerable energy in ohmic losses. Because wasted energy must typically be dissipated as heat, switched-mode power converters have reduced heat dissipation requirements, relative to other power converters such as linear regulators, meaning that fewer and/or smaller heat sinks are required. For these reasons, switched-mode power converters are commonly used for converting DC voltage levels in applications requiring high efficiency.

Isolated switched-mode power converters use a transformer to provide galvanic isolation between a primary (input) and secondary (output) side of the converter. Switch devices on the primary side of the transformer are used to create an alternating current (AC) voltage component from an input DC voltage. This AC voltage is used to energize a primary winding of the transformer which, in turn, induces an AC voltage on a secondary winding of the transformer. The AC voltage on the secondary winding is rectified and filtered to provide a DC output voltage that may be used by some output load of the power converter.

The DC output voltage and current is determined by the switching of the primary side switch devices. In typical applications, a pulse-width modulated (PWM) waveform is used to control each of the primary side switch devices such that they provide an appropriate level of energy to the primary winding which, ultimately, determines the voltage output from the power converter. A secondary side controller typically monitors the output voltage and current, and generates appropriate PWM waveforms which are transferred to the primary side for use by the primary side switch devices. The secondary side controller may perform other functions including, e.g., providing control signals to rectify the secondary side AC voltage using switch devices on the secondary side.

The secondary side controller is, typically, a digital circuit that must be powered during both start-up and fully operational phases of the power converter. Current solutions for providing power to a secondary side controller usually employ an auxiliary power supply on the primary side which is powered by the DC input voltage. A second transformer is included in the power converter and transfers power from this primary side auxiliary supply to an auxiliary supply on the secondary side so that the secondary side auxiliary supply can provide power to the secondary side controller. Such solutions have the disadvantages that they require a second transformer (or an additional pair of windings within an existing transformer) as well as an auxiliary power supply on the primary side.

Circuits and methods for providing an auxiliary power supply on a secondary side of an isolated switched-mode power converter are desired. Such circuits and methods should require minimal circuit components beyond what is required for the power converter, and should be capable of supplying power to a secondary side controller during start-up and steady-state operation of the power converter.

SUMMARY

According to an embodiment of a switched-mode power converter circuit using an isolated topology for converting power from an input source into power for an output load, the switched-mode power converter circuit comprises a transformer, one or more primary side switch devices, a primary side startup circuit, a secondary side controller circuit, and a secondary side auxiliary power supply circuit. The transformer provides isolation between a primary and secondary side, and includes a primary side winding and one or more secondary side windings. The primary side switch device(s) are electrically connected to the primary side winding and energize this winding when they are conducting current. The secondary side controller circuit is coupled to one or more of the secondary side windings, and is configured to control switching of the primary side switch device(s) during a steady-state operating phase in which the secondary side controller circuit is fully powered and operational. The primary side startup circuit is configured to control switching of the primary side switch device(s) during a startup operating phase during which the secondary side controller circuit is not controlling the switching of the primary side switch device(s), so as to energize the primary side winding during this startup operating phase. The secondary side auxiliary power supply circuit is galvanically isolated from the primary side winding and is configured to supply power to the secondary side controller circuit based on energy transferred from the primary side winding during at least the startup operating phase.

According to an embodiment of a primary side driver circuit in a switched-mode power converter using an isolated topology, the primary side driver circuit is configured to generate switch control signals that are provided to control terminals of one or more primary side switch devices in order to energize a primary side winding of a transformer. The primary side driver circuit comprises input terminals that are configured for inputting external control signals provided by a secondary side of the switched-mode power converter. The primary side driver circuit further includes a startup circuit that is configured to generate startup control signals that control switching of the primary side switch device(s) during a startup phase, e.g., before the external control signals are being provided by the secondary side of the switched-mode power converter. The primary side driver circuit yet further includes a selection circuit configured to provide the switch control signals based upon the generated startup control signals during the startup operating phase, and based upon the external control signals during a steady-state operating phase.

According to an embodiment of a method in a primary side driver circuit of a switched-mode power converter using an isolated topology, switch control signals are generated and provided to control terminals of one or more primary side switch devices in order to energize a primary winding of a transformer of the switched-mode power converter. The method includes the monitoring of external control signals that are provided from a secondary side of the switched-mode power converter. Startup control signals that control the switching of one or more primary side switch devices are generated based upon default parameters. When it is detected that the switched-mode power converter is operating in a startup operating phase, switch controls signals are provided to the primary side switch device(s) based upon the generated startup control signals.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide for an auxiliary power supply on the secondary side of an isolated switched-mode power converter. This auxiliary power supply provides power to secondary side circuits, such as a secondary side controller, during startup and steady-state operational phases of the power converter. This is accomplished by using a primary side self-starting driver circuit to control primary side switches in order to energize the primary winding of a transformer during the startup operational phase. This self-starting primary side driver circuit controls the primary side switches before the secondary side controller is fully operational. After the secondary side controller becomes fully operational, the power converter enters a steady-state operational phase in which the secondary side controller controls the primary side switch devices. During the startup operating phase, the self-starting primary side driver circuit forces the transfer of enough energy through the transformer to supply the secondary side auxiliary power supply, but does not provide enough energy to supply the output voltage from the power converter, e.g., as would be needed to drive an output load of the power converter.

The described embodiments have the advantages that they do not require a primary side auxiliary supply dedicated to supplying a secondary side auxiliary power supply, and do not require a dedicated transformer (or two additional windings) for transferring energy to the secondary side auxiliary power supply.

Various embodiments will now be described in the following detailed description and the associated figures. These embodiments provide particular examples for purposes of explanation, and are not meant to limit the invention. Features and aspects from the example embodiments may be combined or re-arranged except where the context does not allow this.

The invention is directed to embodiments of isolated switched-mode power converters. Such power converters are, generally, well-known in the art. In order to avoid obfuscating the unique aspects of the invention, well-known aspects of such power converters are not discussed in detail. For example, algorithms for calculating signals that control the primary side switches, e.g., the frequency and duty cycle of pulse-width modulated (PWM) waveforms, in order to maintain a given output voltage are not detailed. Likewise, detailed techniques for rectifying voltage waveforms on the secondary side are not provided, as such techniques are also well-known in the art. Instead, the following descriptions focus on circuits and methods for providing a secondary side auxiliary power supply, including primary side circuits and methods for energizing primary winding(s) of a transformer, during a startup phase of a power converter in which the secondary side controller is not fully operational.

Isolated switched-mode power converters may be implemented using a variety of topologies such as flyback, forward, active clamp forward, half-bridge, full-bridge, and push-pull. The inventive techniques described herein may be implemented similarly within several such topologies, and the specific topology is not particularly important. In order to avoid unnecessary complexity, the example embodiments will be described using a limited set of topologies, with the understanding that the invention may be implemented within other topologies also.

Embodiments directed to isolated switched mode power converter circuits, including primary and secondary side circuits, are described first. This is followed by detailed descriptions of embodiments for primary side driver circuits. Lastly, embodiments directed to methods that may be implemented in primary side driver circuits are described.

Switched-Mode Power Converter Circuits with Self-Starting Primary Side Driver

Figure 1:
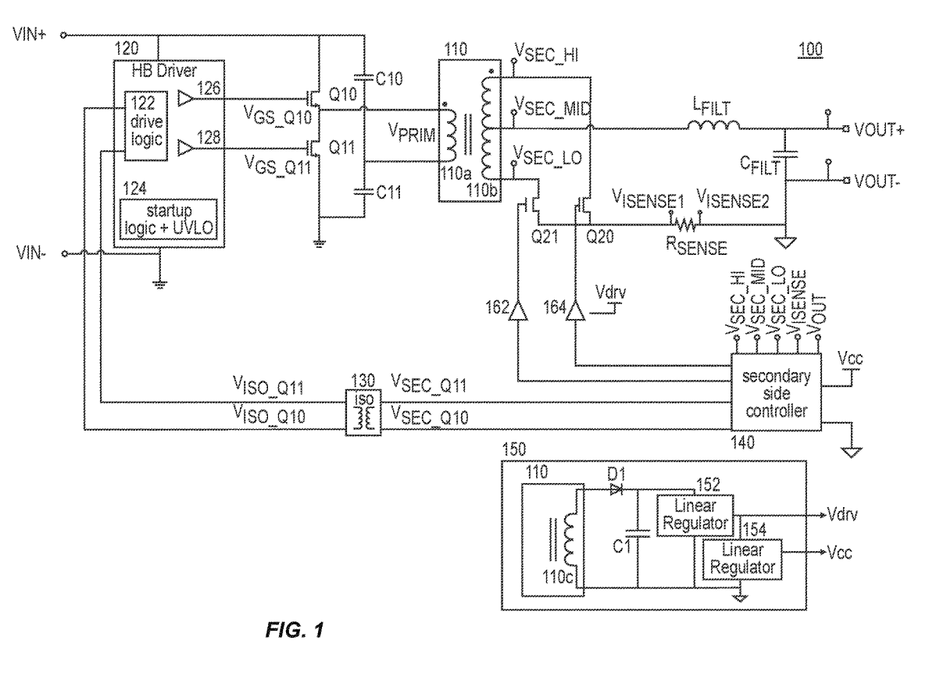
FIG. 1 illustrates an isolated switched-mode power converter circuit configured in a half-bridge topology and having a secondary side auxiliary power supply circuit.

FIG. 1 illustrates an embodiment of an isolated switched-mode power converter circuit 100 that may be used to convert an input power source into a voltage and current appropriate for an output load. The illustrated power converter 100 is implemented using a half-bridge topology and, thus, is specifically a half-bridge converter.

A transformer 110 provides galvanic isolation between the primary and secondary sides of the power converter circuit 100. In addition to a primary winding 110a and a secondary winding 110b, the transformer 110 also includes a secondary side auxiliary winding 110c. The circuits to the left of the transformer 110 are referenced as being on the primary side of the power converter, whereas the circuits to the right of the transformer 110 are referenced as being on the secondary side.

An input voltage VIN is provided to the primary side of the power converter circuit 100 from an external source (not shown). The primary winding 110a of the transformer 110 is energized by enabling either switch device Q10 or switch device Q11. When switch device Q10 is enabled such that it conducts, the input voltage VIN+ is connected to the positive terminal (shown with a dot) of the primary winding 110a creating a positive voltage across the winding 110a so that current flows from VIN+ through the winding 110a to the node connecting capacitors C10 and C11. The voltage at this node then rises towards VIN+. Alternatively, when switch device Q11 is enabled, the positive terminal of the primary winding 110a is connected to ground. Due to the positive voltage previously stored at the node between capacitors C10 and C11, current flows through the primary winding 110a in a direction opposite to that of the current that flowed when switch device Q10 was enabled. Note that switch devices Q10 and Q11 are never enabled at the same time in this configuration. The switch devices Q10 and Q11 are enabled at a switching frequency and with a duty cycle. The percentage of time that the switch devices Q10 and Q11 are enabled determines the amount of power transferred to the primary winding 110a.

The switch devices Q10 and Q11 are shown in FIG. 1 as enhancement mode metal-oxide semiconductor field-effect transistors (MOSFETs), but other switch devices may be used. For example, junction field-effect transistors (JFETs), bipolar junction transistors (BJTs), insulated gate bipolar transistors (IGBTs), high electron mobility transistors (HEMTs), or other types of power transistors may be preferred in some applications.

The switch devices Q10 and Q11 have control terminals that are used to enable conduction through the switch devices. For the enhancement mode MOSFETs shown, these control terminals are gate terminals. A positive voltage of sufficient magnitude that is applied to a gate terminal (relative to a source terminal) of an enhancement mode MOSFET forces the MOSFET to conduct current between its drain and source terminals. The gate terminals are driven by control signals $V_{GS\_Q10}$ and $V_{GS\_Q11}$ that are output from a half-bridge (HB) driver circuit 120.

The HB driver circuit 120 includes a drive logic circuit 122, a startup logic and under-voltage lockout (UVLO) circuit 124 and drivers 126, 128. The drivers 126, 128 provide voltage waveforms appropriate for driving the control terminals of the switch devices Q10, Q11 and, more particularly, ensure that the switch devices Q10, Q11 switch quickly so as to minimize time spent during transition periods between the conducting and non-conducting states of the switch devices. Power transistors, including power MOSFETS, are lossy during these transition periods and, thus, efficient operation requires that such transition periods be minimized.

During steady-state operation of the power converter circuit 100, the drive logic circuit 122 provides voltage waveforms to the drivers 126, 128 based upon external control signals $V_{ISO\_Q10}$, $V_{ISO\_Q11}$. Control signals $V_{SEC\_Q10}$, $V_{SEC\_Q11}$ are generated on the secondary side of the power converter circuit 100 and transferred to the primary side through an isolation circuit 130. The isolation circuit 130 may be an optocoupler or similar type of circuit. The external control signals $V_{ISO\_Q10}$, $V_{ISO\_Q11}$ determine the amount of energy that the switch devices Q10, Q11 transfer to the primary winding 110a of the transformer 110 during steady-state operation.

The startup logic and UVLO circuit 124 is used during a startup operational phase before the power converter circuit 100 reaches its steady-state operation. The drive logic circuit 122 detects whether the power converter circuit 100 is in a startup operational phase. This is accomplished by monitoring the external control signals $V_{ISO\_Q10}$, $V_{ISO\_Q11}$ and determining that there is no activity on them. In a preferred embodiment, the drive logic circuit 122 includes an activity detector (e.g., a comparator) and a timer. If the drive logic circuit 122 detects that the voltage levels on the external control signals $V_{ISO\_Q10}$, $V_{ISO\_Q11}$ have not changed for some predetermined time period, then the drive logic circuit 122 determines that the power converter circuit 100 is in a startup operational phase rather than a steady-state operational phase.

The startup logic and UVLO circuit 124 includes a voltage comparator to determine if the source voltage VIN is above a predetermined voltage threshold, so as to ensure that the startup logic functions properly. (The circuits within the HB driver 120, including the startup logic and UVLO circuit 124, are typically powered from the source voltage VIN.)

Once the drive logic circuit 122 has determined that the power converter circuit 100 is in a startup operational phase, and the UVLO circuit has determined that the source voltage VIN is adequate, the startup logic and UVLO circuit 124 begins generating control signals for the primary side switch devices Q10 and Q11. These signals may be generated, e.g., by a local oscillator that is configured to provide PWM waveforms, wherein each such waveform has a given frequency and duty cycle. The frequency and duty cycles may be hard-coded to default values, or may be configurable, e.g., via configuration pins that are read at startup of the HB driver 120. The control signals are generated such that the switch devices Q10 and Q11 energize the primary winding enough to transfer adequate energy to supply an auxiliary supply on the secondary side.

Figure 2:
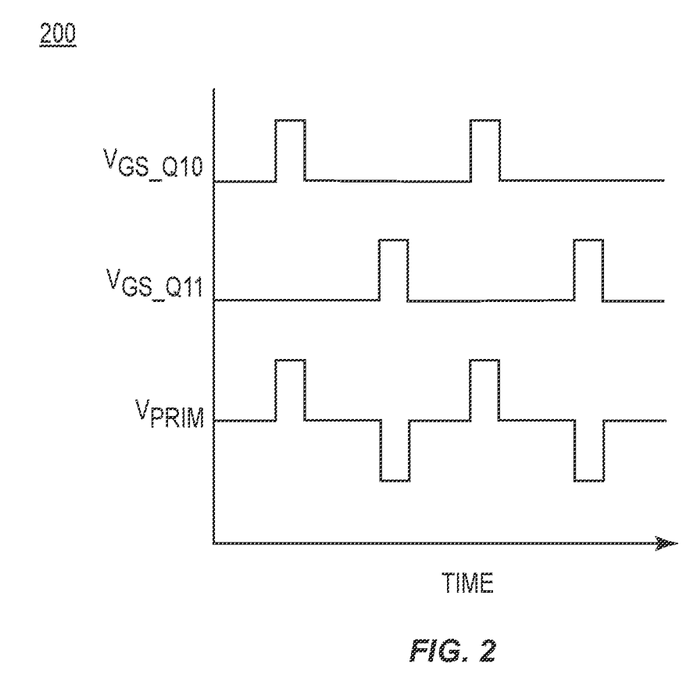
FIG. 2 illustrates waveforms that may be generated by a primary side driver circuit in order to control primary side switch devices.

FIG. 2 illustrates waveforms 200 as may be generated by the HB driver 120 during the startup operational phase. Control signals $V_{GS\_Q10}$, $V_{GS\_Q11}$ are generated and supplied to control terminals of the switch devices Q10, Q11. The control signals $V_{GS\_Q10}$, $V_{GS\_Q11}$ are each shown as PWM waveforms having a given frequency and duty cycle, and include pulses that are offset relative to each other. When either of the switch devices Q10, Q11 is enabled (conducting), a voltage $V_{PRIM}$ is provided across the primary winding 110a of the transformer 110. This voltage $V_{PRIM}$ is positive when switch device Q10 is conducting and negative when switch device Q11 is conducting, i.e., the voltage provided across the primary winding 110a is an AC voltage.

Further detail regarding the HB driver 120 and variants of its circuitry are provided in the description of "Self-Starting Primary Side Driver Circuits," which is provided further below. Attention is now turned to the secondary side of the power converter circuit 100.

The transformer 110 includes a secondary winding 110b having a center tap. As explained above, an AC signal is driven onto the primary winding 110a. This, in turn, means that an AC voltage is induced on the secondary winding 110b. In order to produce a DC voltage at the power converter output VOUT, the voltage across the secondary winding 110b must be rectified. As shown in FIG. 1, rectification is accomplished using secondary side switch devices Q20 and Q21. A secondary side controller 140 monitors the winding voltages $V_{SEC\_HI}$, $V_{SEC\_LO}$, and controls switch devices Q20 and Q21 to ensure that the voltage $V_{SEC\_MID}$ at the center tap of the secondary winding 110b remains positive. For example, when the high-side voltage $V_{SEC\_HI}$ of the secondary winding 110b is sufficiently positive, switch device Q21 is enabled to create a positive voltage $V_{SEC\_MID}$ at the center tap. Conversely, when the low side voltage $V_{SEC\_LO}$ is sufficiently positive, switch device Q20 is enabled to create a positive voltage $V_{SEC\_MID}$ at the center tap. The voltage at the center tap is smoothed using a simple filter comprised of an inductor $L_{FILT}$ and a capacitor $C_{FILT}$ before being provided to an output load (VOUT).

Note that rectification may be accomplished in other ways. As is well-known in the art, diodes may be used to rectify an AC signal and do not require switch devices or control signals as described above. However, an implementation using switch devices, as illustrated in FIG. 1, tends to be more power efficient than other rectification techniques.

The secondary side controller 140 may be implemented using analog hardware components (such as transistors, amplifiers, diodes, and resistors), may be implemented using processor circuitry including primarily digital components, or may be implemented using a combination of analog hardware components and processor circuitry. The processor circuitry may include one or more of a digital signal processor (DSP), a general-purpose processor, and an application-specific integrated circuit (ASIC). The secondary side controller 140 may also include memory, e.g., non-volatile memory such as flash, that includes instructions or data for use by processor circuitry. The secondary side controller 140 provides a variety of output signals (e.g., $V_{SEC\_Q10}$, $V_{SEC\_Q11}$), inputs several sensor signals (e.g., $V_{SEC\_LO}$, $V_{SEC\_MID}$, $V_{SEC\_HI}$, $V_{ISENSE}$, $V_{OUT}$), and is supplied power Vcc. As shown in FIG. 1, the secondary side controller 140 provides two principle functions.

First, the secondary side controller 140 provides control signals, via, optionally, driver circuits 162, 164, to switch devices Q20, Q21 in order to rectify an AC voltage provided on the secondary winding 110b of the transformer 110. The secondary side controller 140 senses the voltages $V_{SEC\_LO}$, $V_{SEC\_MID}$, $V_{SEC\_HI}$ at taps on the secondary winding 110b in order to generate these control signals. Such rectification techniques are described above and are well-known in the art and, hence, will not be described in further detail.

Second, the secondary side controller 140 generates control signals $V_{SEC\_Q10}$, $V_{SEC\_Q11}$ to control the amount of power that is transferred through the transformer 110 and, ultimately, to an output load (VOUT). As previously mentioned, the control signals are usually PWM waveforms where the frequency and duty cycles of the waveforms determine the amount of power transferred. When using closed-loop voltage control, as is typical, the secondary side controller 140 monitors the output voltage (VOUT) and, optionally, an output current. The output current may be monitored using a sensing resistor $R_{SENSE}$. The secondary side controller 140 will attempt to maintain a desired voltage level at the output voltage (VOUT) by appropriately modifying the frequency and/or duty cycles of the PWM waveforms. For example, if the output voltage VOUT drops below the desired voltage level, the duty cycle of the PWM waveforms may be increased to force more power to be transferred across the transformer 110. Conversely, if the output voltage VOUT rises above the desired voltage level, the duty cycle of the PWM waveforms may be decreased in order to reduce the amount of power being transferred across the transformer 110.

The secondary side controller 140 is provided with a power supply Vcc. A secondary side auxiliary power supply circuit 150 is configured to provide the supply Vcc. The secondary side auxiliary power supply circuit 150 includes an auxiliary winding 110c on the secondary side of the transformer 110. This auxiliary winding 110c is energized when current flows through the primary winding 110a of the transformer 110, and is separate from the secondary winding 110b that provides power to an output load, e.g., at VOUT. The auxiliary winding 110c is connected to a diode D1 that serves to rectify the AC voltage induced on the auxiliary winding 110c. A capacitor C1 filters the resultant rectified voltage. The filtered, rectified voltage is input to a first linear regulator 152 that outputs a first auxiliary power supply Vdrv. The first auxiliary power supply output is input to a second linear regulator 154 that outputs a second auxiliary power supply Vcc. In the embodiment of FIG. 1, the first auxiliary power supply output is used to supply power to the driver circuits 162, 164 that are connected to the secondary side switch devices Q20, Q21. The second auxiliary power supply output Vcc is used to supply power to the secondary side controller 140. In some implementations, only one auxiliary power supply may be needed, in which case one of the linear regulators could be omitted. In other implementations, more auxiliary power supply outputs may be required, in which case additional linear regulators may be necessary. While linear regulators are shown in FIG. 1 and are generally preferred, note that other components could be used, e.g., switching regulators, divider circuits, etc.

The secondary side auxiliary power supply circuit 150 provides the auxiliary power supplies Vcc and Vdrv during both the startup and steady-state operational phases of the power converter 100. During the startup operational phase, the secondary side controller 140 is not yet operational and is not controlling (activating) the primary side switch devices Q10, Q11 or the secondary side switch devices Q20, Q21. Nonetheless, the HB driver circuit 120 is autonomously energizing the primary winding 110a of the transformer 100 such that the secondary side auxiliary power supply circuit 150 is supplied power and can generate the auxiliary power supplies Vcc and Vdrv. During the steady-state operational phase, the secondary side controller 140 is operational and controls the primary side switch devices Q10, Q11 and the secondary side switch devices Q20, Q21. The HB driver circuit 120 is, again, energizing the primary winding 110a of the transformer 100, but does so by using the control signals $V_{ISO\_Q10}$, $V_{ISO\_Q11}$ that are generated by the secondary side controller circuit 140 to activate the primary side switch devices Q10, Q11.

Figure 3:
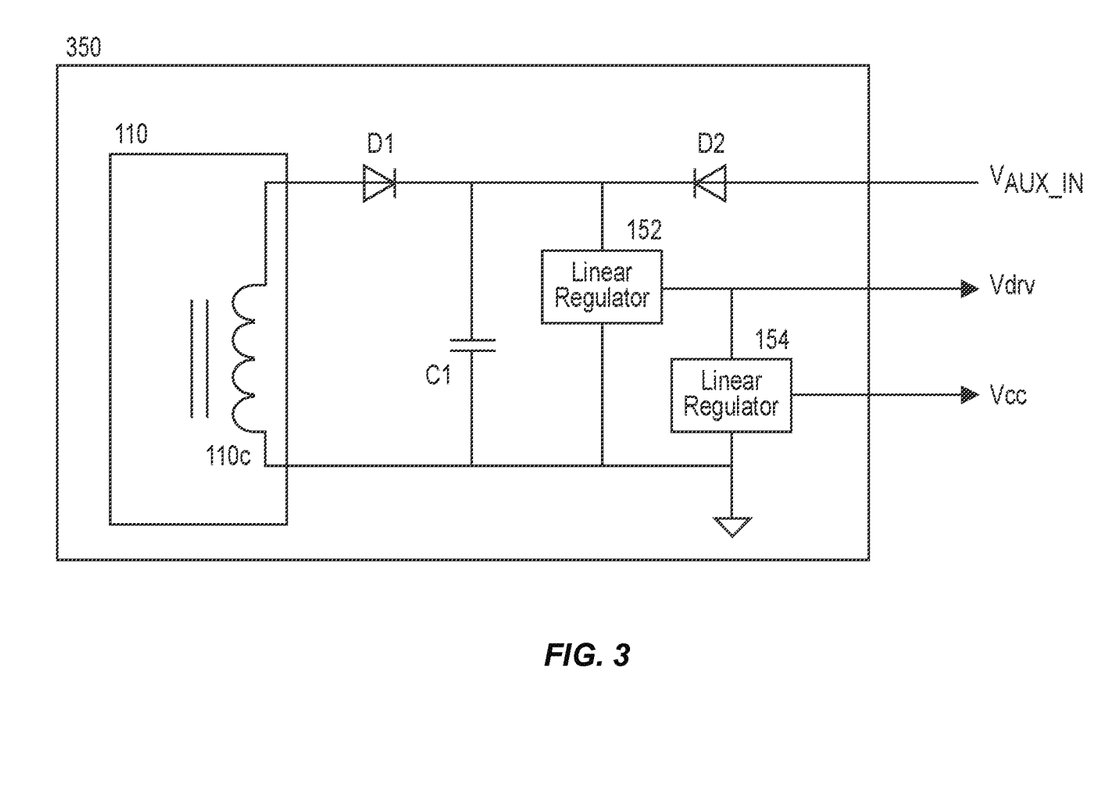
FIG. 3 illustrates an alternative embodiment of a secondary side auxiliary power supply circuit that is supplied power by an auxiliary winding of a transformer or by another input power supply that is derived from the switched-mode power converter output supply that powers an output load.

FIG. 3 illustrates an alternative embodiment of a secondary side auxiliary power supply circuit 350. This embodiment differs from that of FIG. 1 in that the input power to the auxiliary power supply circuit 350 may be supplied from an external source $V_{AUX\_IN}$ other than the auxiliary winding 110c. The external source $V_{AUX\_IN}$ is derived from the power supply that is used to supply the output load which, in turn, is driven from the secondary winding 110b of the transformer 110. For example, the output voltage VOUT may be connected to $V_{AUX\_IN}$. In a more typical case, the output voltage VOUT will need to be stepped down before being supplied to $V_{AUX\_IN}$. This may be accomplished using, e.g., another regulator (linear, switched) or a simple voltage divider. Once the power converter circuit 100 is fully operational such that the output load is being supplied power (e.g., via output voltage VOUT), $V_{AUX\_IN}$ rises to a level such that diode D2 is forward biased (activated) and diode D1 is disabled. In the secondary side auxiliary power supply circuit 350 of FIG. 3, auxiliary power is supplied by the auxiliary winding 110c and diode D1 during the start-up operational phase of the power converter circuit 100, and is supplied by the external source $V_{AUX\_IN}$ and diode D2 during the steady-state operational phase of the power converter circuit 100. Note that a switch device (not shown), such as a depletion mode MOSFET, may be placed in series with diode D1, or may replace diode D1 in order to better control the switching between the input supplies to the secondary side auxiliary power supply circuit 350.

Figure 4:
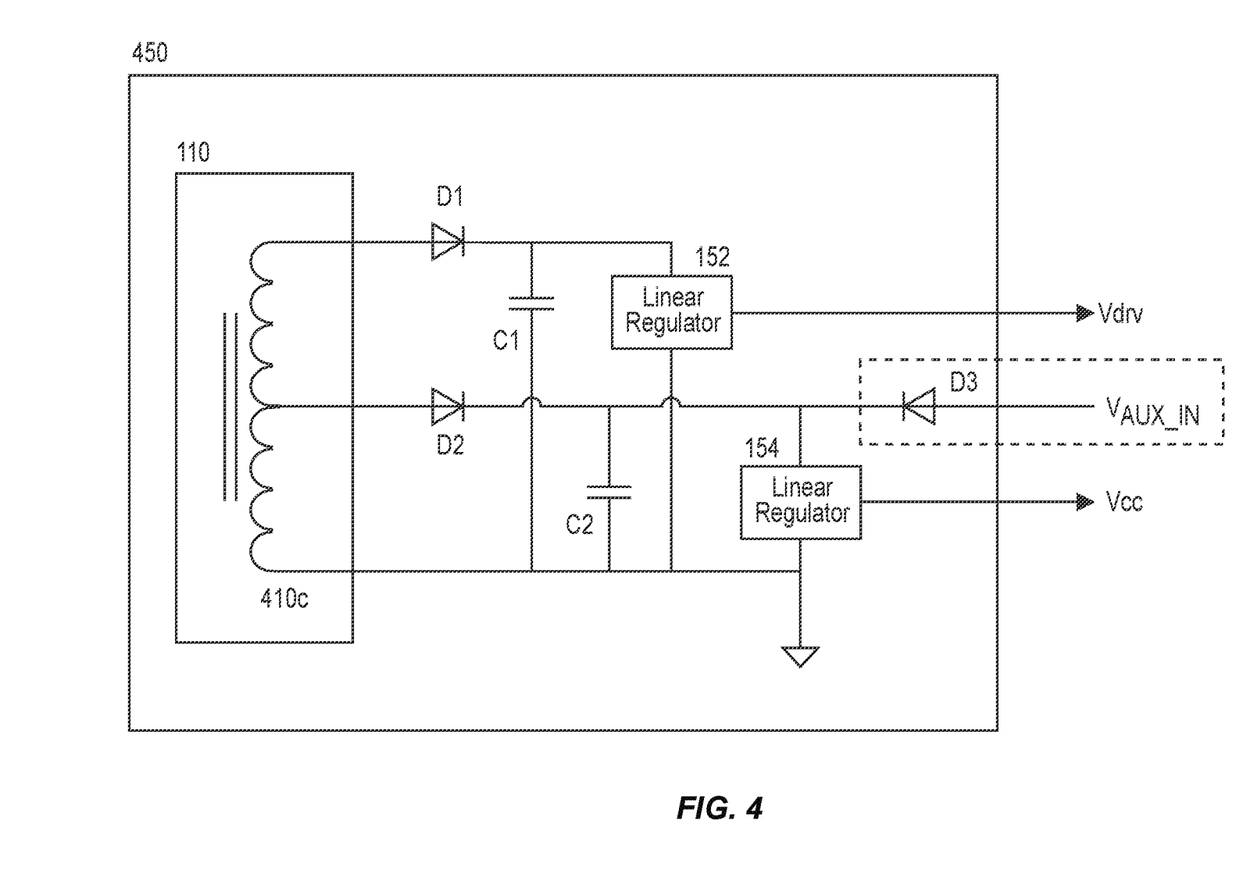
FIG. 4 illustrates yet another alternative embodiment of a secondary side auxiliary power supply circuit in which the auxiliary winding includes a center tap for supplying at least one of the auxiliary power supply outputs.

FIG. 4 illustrates yet another alternative embodiment of a secondary side auxiliary power supply circuit 450. In this embodiment, an auxiliary winding 410c includes a center tap. The first linear regulator 152 is supplied power in the same manner as is shown in FIGS. 1 and 3. However, the second linear regulator 154 is supplied power, via diode D2, from the center tap of the auxiliary winding 410c. The supply input to the second linear regulator 154 is filtered using capacitor C2. In a manner similar to that shown in FIG. 3, an external source $V_{AUX\_IN}$ and a diode D3 may be used to supply power to the second linear regulator 154 when the power converter circuit 100 is in the steady-state operational mode. As indicated by the dotted box, this input is optional. Note that, in addition to or instead of the external source $V_{AUX\_IN}$ and diode D3 connected to the second linear regulator 154, an external source and diode may be used to supply the first linear regulator 152. (This is not shown.)

Figure 5:
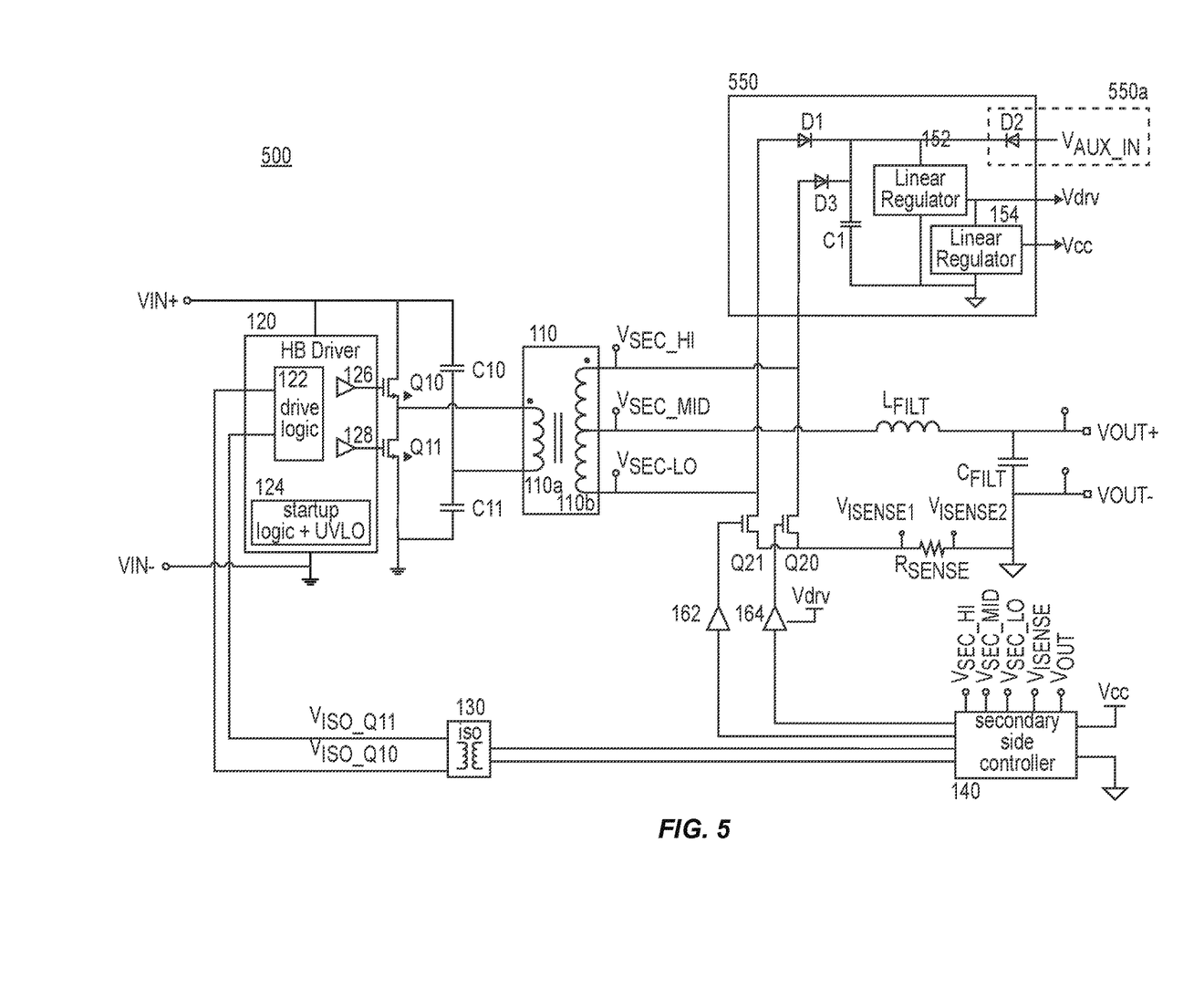
FIG. 5 illustrates an isolated switched-mode power converter circuit having a secondary side auxiliary power supply circuit that does not require the use of an auxiliary winding of a transformer.

FIG. 5 illustrates yet a further alternative embodiment of a secondary side auxiliary power supply circuit 550. This embodiment differs from the previously-described embodiments in that no auxiliary winding of the transformer 110 is required. Rather than being supplied from an auxiliary winding of the transformer 110, the secondary side auxiliary supply circuit 550 is supplied power from the secondary winding 110b that also supplies the output load of the power converter circuit 100. During the startup operational phase of the power converter 500, secondary side switch devices Q20, Q21 are not yet being activated. However, voltage may be induced across the secondary winding 110b of the transformer 110. This induced voltage is provided to secondary side auxiliary power supply circuit 550 and is rectified using diodes D1 and D3. The capacitor C1 filters the rectified voltage, which is supplied to a first linear regulator 152 and, subsequently, a second linear regulator 154 in much the same manner as in the previous embodiments. Also as in previous embodiments, an external source $V_{AUX\_IN}$ and diode D2 may optionally be used to supply power to the secondary side auxiliary power supply circuit 550 during a steady-state operational phase of the power converter 500.

The embodiments described above are based upon a half-bridge topology. However, the inventive techniques are equally applicable in other switched-mode power converter topologies. Because other topologies are generally well-known, they will not be described in great detail. However, a handful of other topologies will be briefly described in order to show how a secondary side auxiliary supply circuit and a primary side driver circuit might fit into other topologies.

Figure 6:
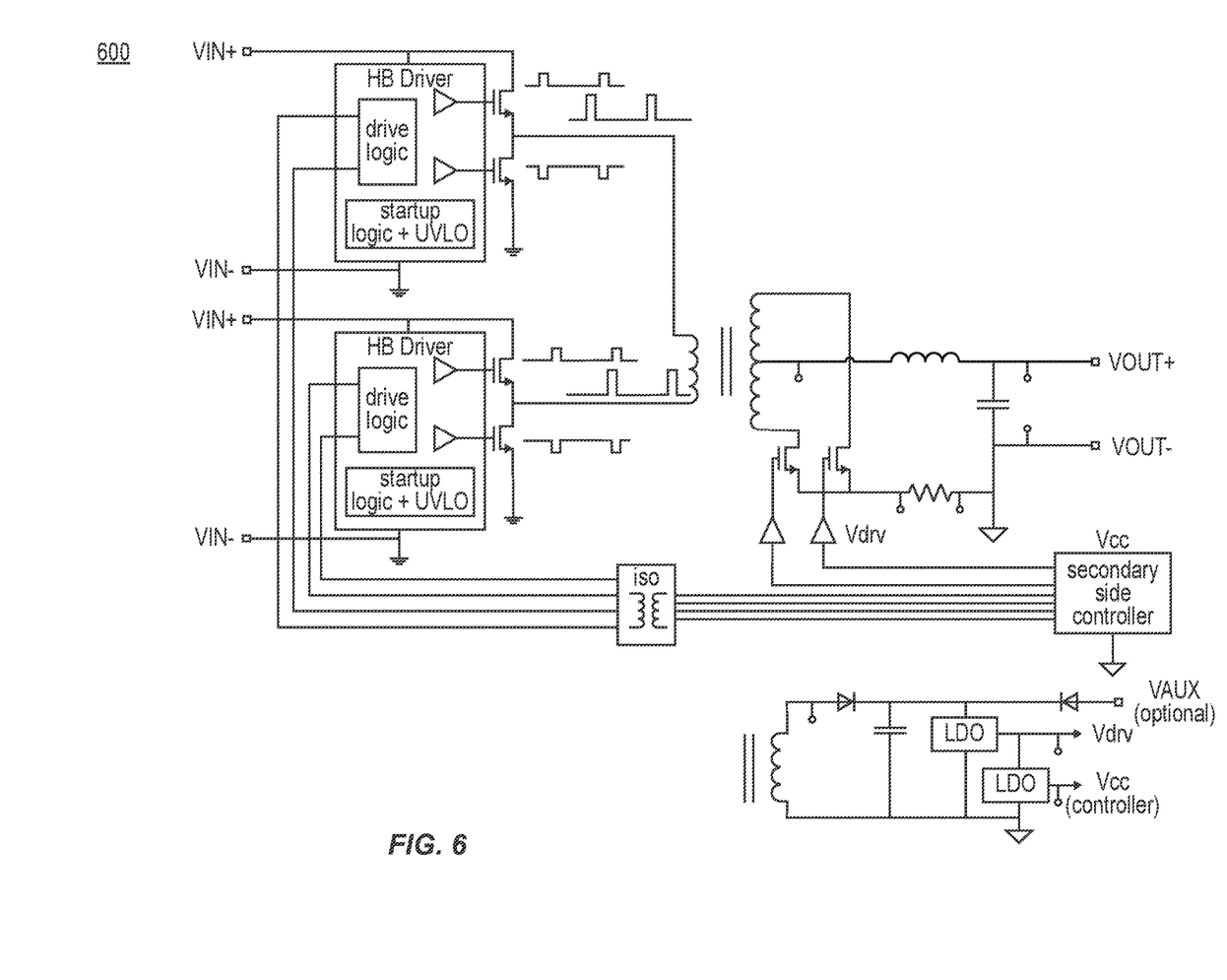
FIG. 6 illustrates an isolated switched-mode power converter circuit configured in a full-bridge topology.

FIG. 6 illustrates an isolated switched-mode power converter circuit 600 configured in a full-bridge topology. A first half-bridge (HB) driver circuit (the topmost one in FIG. 6) controls two switch devices (e.g., MOSFETs) in order to connect an input source VIN+ to a primary winding of a transformer. These switch devices are operated in a complementary fashion such that, at any given time, exactly one of the two switch devices is enabled. When the top switch is enabled (conducting), the bottom switch is disabled (not conducting) and a positive voltage (VIN+) is connected to the top of the primary winding. When the top switch is disabled (not conducting), the bottom switch is enabled (conducting) and the top of the primary winding is connected to ground. A second HB driver circuit (the bottom-most one in FIG. 6) operates in a similar manner in order to control the voltage connected to the bottom of the primary winding. Preferably, the pulsing of the topmost switch devices is offset in time relative to the bottommost switch devices. During the startup operational phase of the power converter 600, the HB drivers are configured to control the switch devices using PWM waveforms having default frequency and duty cycles. In order to implement the time offset between the pulsing of the top and bottom switch device pairs, the two HB driver circuits must be connected to each other in order to coordinate their respective switch device control signals.

Figure 7:
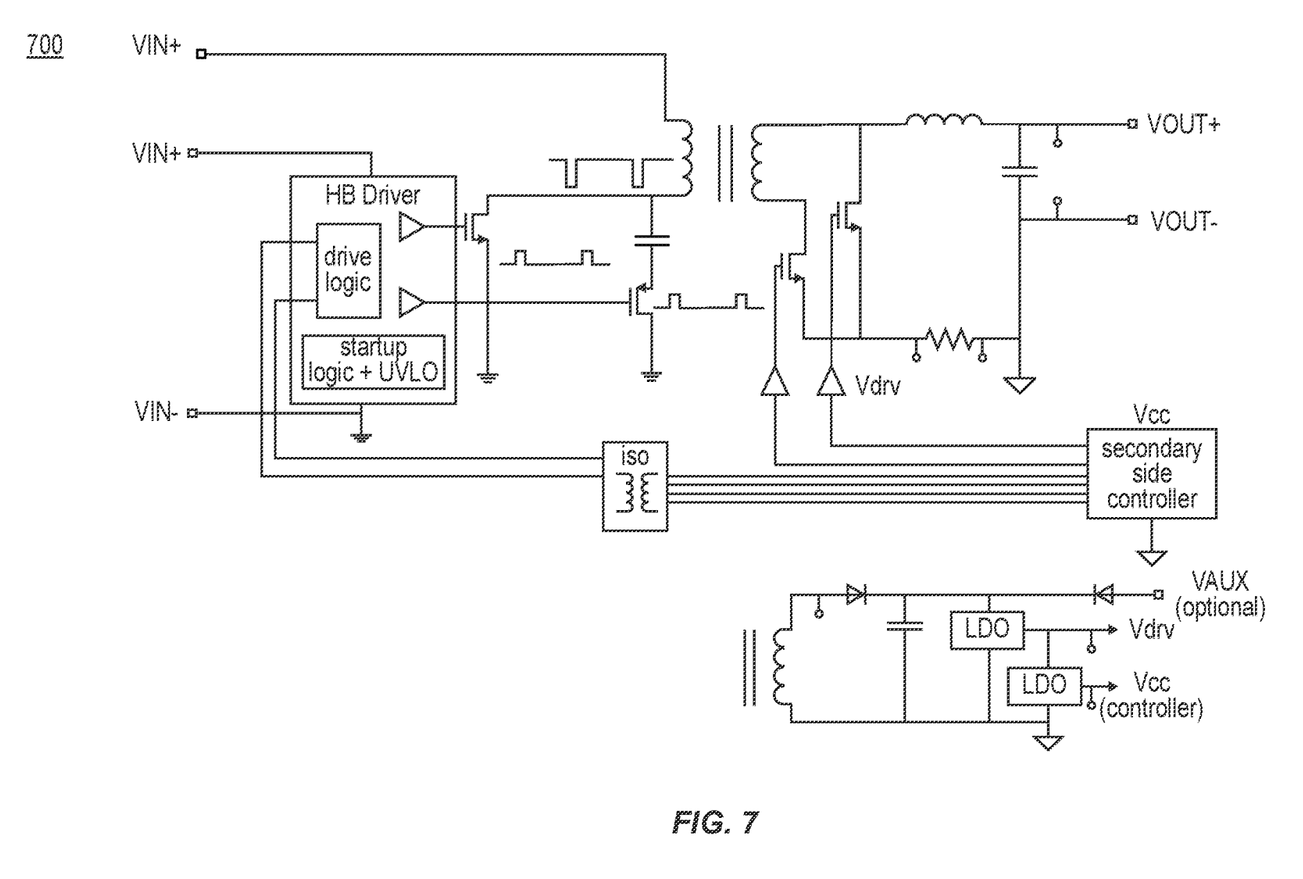
FIG. 7 illustrates an isolated switched-mode power converter circuit configured in an active clamp forward converter topology.

FIG. 7 illustrates an isolated switched-mode power converter circuit 700 configured in an active-clamp forward topology. As seen in FIG. 7 and known in the art, a primary side driver circuit controls two primary side switch devices that are configured to supply power to a primary side of a transformer. The generation of the control signals by the primary side driver circuit and the secondary side auxiliary power supply are largely the same as in the previously-described topologies.

Figure 8:
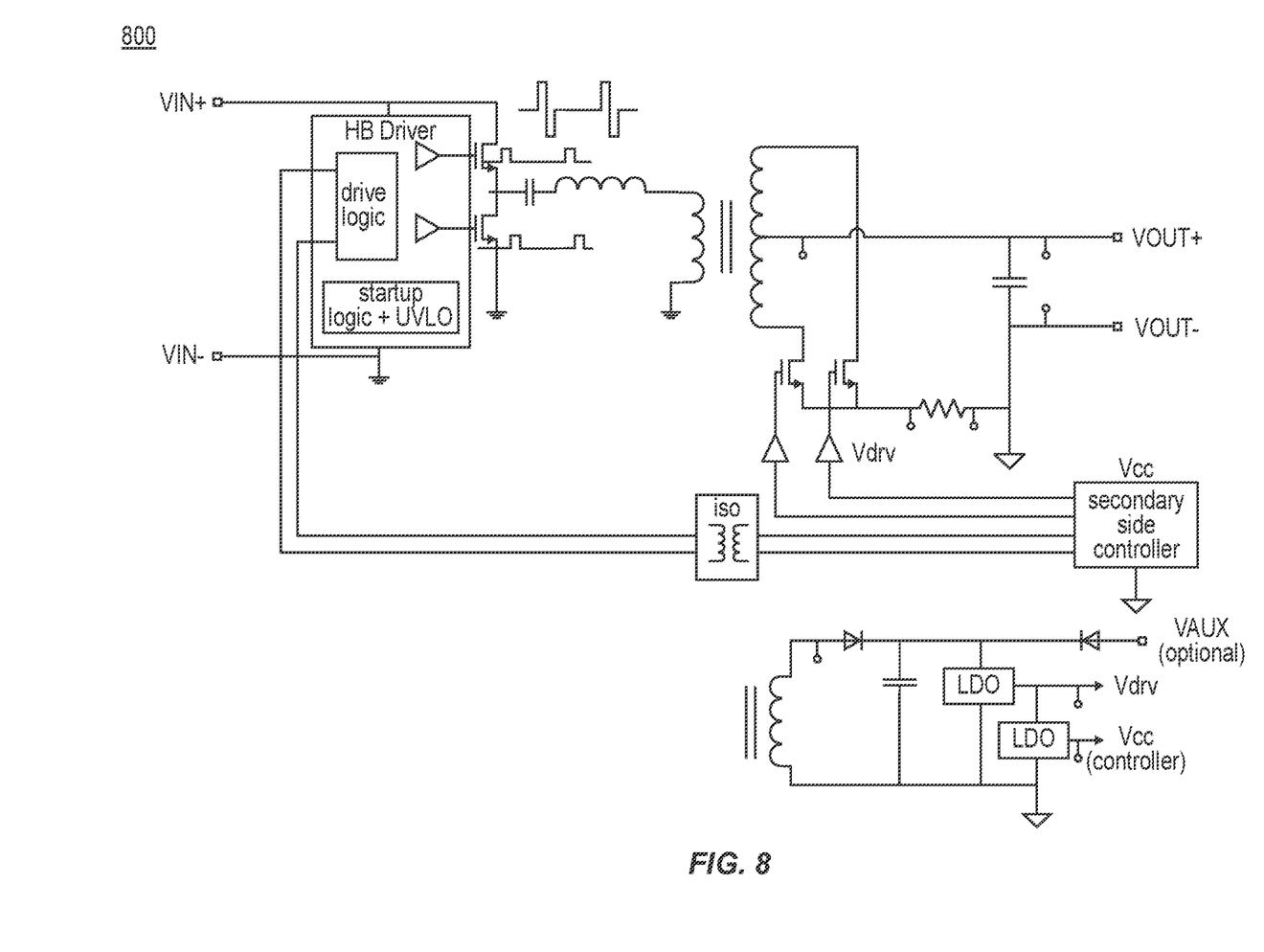
FIG. 8 illustrates an isolated switched-mode power converter circuit configured in a resonant half-bridge topology.

FIG. 8 illustrates an isolated switched-mode power converter circuit 800 configured in an LLC resonant half-bridge converter topology. The primary side driver circuit controls two switch devices in much the same way as in the HB power converter of FIG. 1. However, the control signals for the switch devices are synchronized such that immediately after a pulse is generated on the topmost switch, a pulse is generated on the bottom switch. Such coordination is accomplished in the generation of the control signals by the HB driver during a startup operational phase of the power converter 800.

Self-Starting Primary Side Driver Circuits

The previous section described several embodiments of isolated switched-mode power converter circuits. This section describes self-starting primary side driver circuits, including several alternative embodiments. For ease of explanation, the following description is provided in the context of a half-bridge converter topology. However, it should be understood that the techniques are readily extrapolated to other topologies, as previously explained regarding embodiments of isolated switched-mode power converter circuits.

Figure 9:
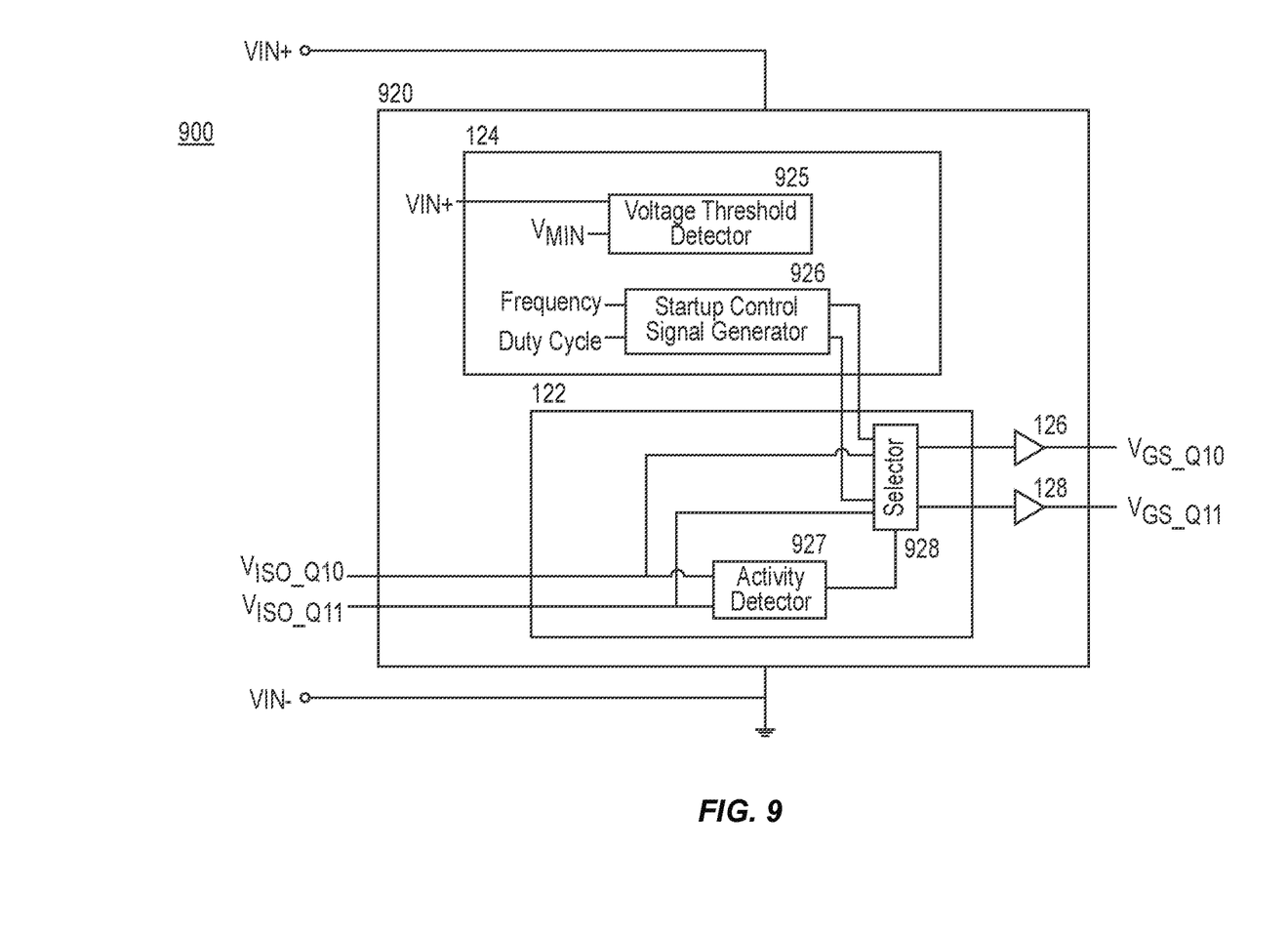
FIG. 9 illustrates an embodiment of a primary side driver circuit.

FIG. 9 illustrates a primary side driver circuit 920 that is similar to the HB driver circuit 120 of FIG. 1. The primary side driver circuit 920 is supplied power by an external power source (not shown) via voltage inputs VIN+, VIN−. The primary side driver circuit 920 inputs external control signals $V_{ISO\_Q10}$, $V_{ISO\_Q11}$. During the steady-state operating phase, the external control signals $V_{ISO\_Q10}$, $V_{ISO\_Q11}$ are generated, e.g., by a secondary side controller circuit which is fully operational. The primary side driver circuit 920 generates and outputs control signals $V_{GS\_Q10}$, $V_{GS\_Q11}$, which may be used to control primary side switch devices and energize a primary side winding of a transformer. The primary side driver circuit 920 includes a startup logic and UVLO circuit 124, a drive logic circuit 122, and switch device drivers 126, 128. The startup logic and UVLO circuit 124 and the drive logic circuit 122 are configured to generate switch device control signals based upon default parameters during a startup operating phase. These circuits are configured to provide switch device control signals based upon externally supplied control signals $V_{ISO\_Q10}$, $V_{ISO\_Q11}$ during the steady-state operating phase.

A startup control signal generator 926 generates control signals for the switch devices during the startup operating phase. In a preferred embodiment, these control signals are PWM waveforms characterized by a frequency and a duty cycle. The frequency and duty cycle are set to default values in the primary side driver circuit 920, and are not determined by any circuitry on a secondary side of the power converter, such as a secondary side controller. The frequency and duty cycle may be hard-coded within the primary side driver circuit 920. Alternatively, values for the frequency and duty cycle may be programmed using a programmable non-volatile memory, e.g., flash memory, or similar within the startup control signal generator 926. In yet another alternative, the values for the frequency and duty cycle may be configured from outside the primary side driver circuit 920. For example, terminal inputs (not shown) of the primary side driver circuit 920 may be tied to particular voltage levels to determine values for the frequency and duty cycle.

The startup control signal generator circuit 926 typically includes an oscillator (not shown) for generating a waveform at the default frequency, a pulse shaping circuit (not shown) for forming appropriate pulse shapes at the default duty cycle for a first switch control signal, and a delay circuit for generating a second switch control signal from the first switch control signal. In combination, these circuits generate PWM waveforms using the default frequency and duty cycle. The oscillator may be implemented using any of several conventional techniques, including resonant RC circuitry, an amplifier-based oscillator, or a crystal-based oscillator.

As the external voltage input VIN is initially ramping up, the provided voltage may be inadequate to supply the startup control signal generator 926. Hence, a voltage threshold detector 925 (i.e., an under-voltage lockout circuit or UVLO) may be used to prevent the startup control signal generator 926 from generating undesirable outputs during an initial ramp-up phase. The voltage threshold detector circuit 925 compares the input supply voltage VIN+ against some minimum threshold voltage $V_{MIN}$. For example, if the input supply voltage VIN+ is typically 75 V in steady-state operation, then the startup control signal generator 926 may be designed to operator properly using supply voltages VIN+ that are greater than 35 V. In such a case, $V_{MIN}$ would be set to 35 V. Regardless of the specific threshold value, the voltage threshold detector 925 outputs an indicator signal after it determines that the input supply voltage VIN+ is greater than the minimum threshold voltage $V_{MIN}$. The indicator signal is provided to startup control signal generator 926, which may use this indicator signal as a trigger to begin generating control signals. The generated control signals are provided to a selector 928 within the drive logic circuitry 122.

The drive logic circuitry 122 is responsible for determining whether the primary side driver 920 is operating in the startup or steady-state operating phase and, based upon this determination, providing appropriate control signals $V_{GS\_Q10}$, $V_{GS\_Q11}$ that could be used by primary side switch devices. The drive logic circuitry 122 includes an activity detector 927 that accepts input control signals $V_{ISO\_Q10}$, $V_{ISO\_Q11}$ as might be generated by a secondary side controller. The activity detector 927 monitors these control signals to determine if there is any activity on them. If no activity (e.g., as indicated by voltage changes) is detected on the control signals within some predetermined time period, the activity detector determines that operation is currently in the startup operating phase. An indication of the operating phase is provided to the selector 928, and the selector 928 selects the control signals generated by startup control signal generator 926 when the startup operating phase is indicated. Conversely, when activity is detected on the input control signals $V_{ISO\_Q10}$, $V_{ISO\_Q11}$, the activity detector determines that operation is in the steady-state operating phase and provides such an indication to the selector 928. For this case, the selector 928 selects the input control signals $V_{GS\_Q10}$, $V_{GS\_Q11}$, and outputs these as control signals $V_{GS\_Q10}$, $V_{GS\_Q11}$ that could be used by primary side switch devices.

When the primary side driver circuit 920 is in the steady-state operating phase, the startup control signal generator 926 does not need to generate control signals. Hence, the indication of steady-state operation, as generated by activity detector 927, may also be provided to the startup control signal generator 926 in order to disable startup control signal generation. (The routing of this indicator signal to the startup control signal generator 926 is not shown in FIG. 9.)

Methods in a Self-Starting Primary Side Driver

Figure 10:
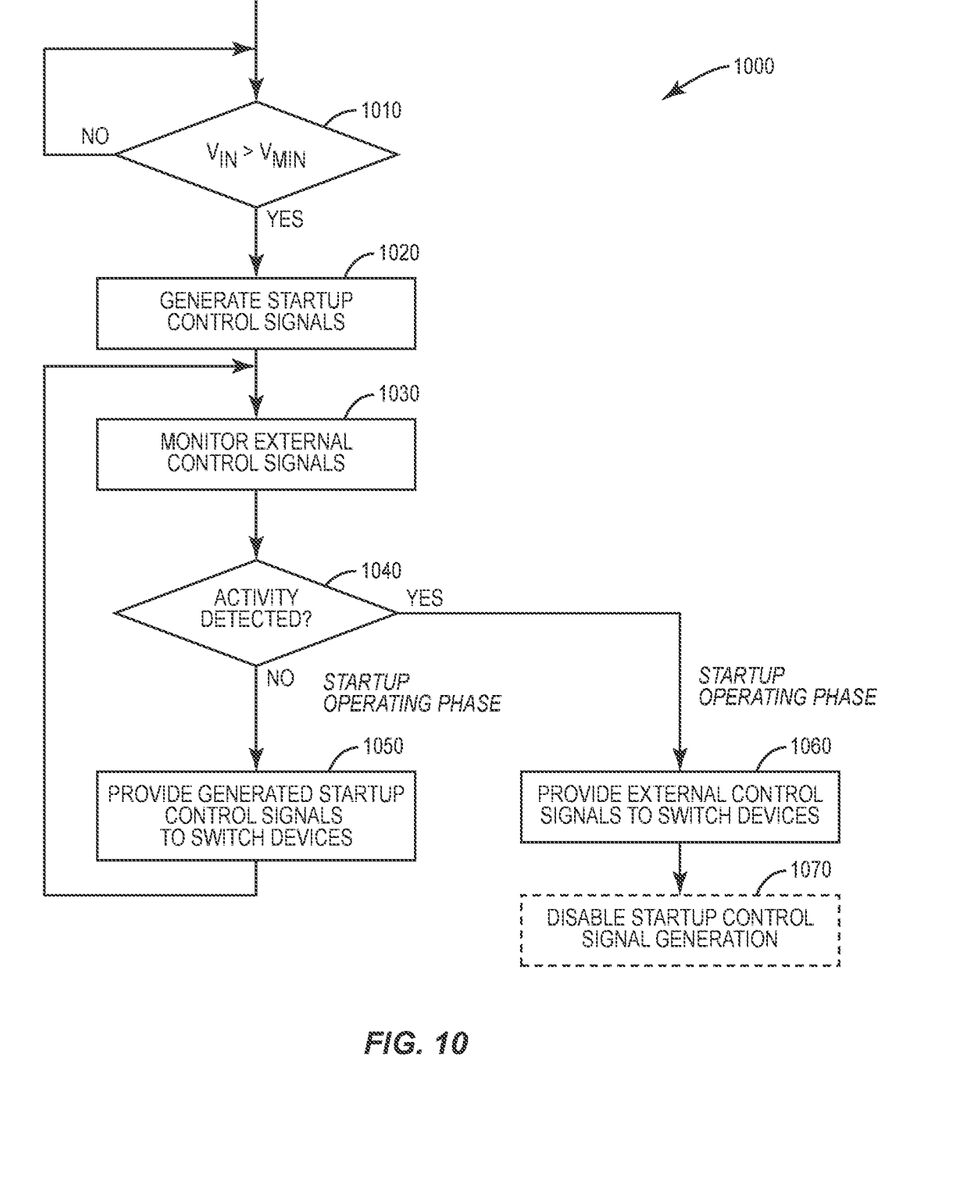
FIG. 10 illustrates an embodiment of a method for generating startup control signals in a primary side driver.

FIG. 10 illustrates an embodiment directed to a method 1000 for generating startup control signals in a self-starting primary side driver. Such a method 1000 may be implemented within a self-starting primary side driver circuit 920 such as that illustrated in FIG. 9.

The method 1000 begins by monitoring a voltage input VIN to determine if it meets a minimum voltage threshold $V_{MIN}$ 1010. As the primary side driver and its associated power converter are powering up, the voltage input VIN will ramp up over some time period. The voltage input VIN powers various circuits (including the startup control signal generator 926) within the primary side driver circuit 920. Proper operation of these circuits requires that the voltage input VIN be above some minimal level. For example, the voltage input VIN may nominally provide a voltage of 75 V during a steady-state operation, and the startup control signal generator 926 may require a voltage input VIN of at least 35 V to operate properly. For such a case, the method would monitor the voltage input VIN until it rises above a voltage level $V_{MIN}=35$ V.

Once the voltage input VIN rises above the minimum voltage $V_{MIN}$, the method continues by generating startup control signals 1020. The startup control signals are typically one or more PWM waveforms, each of which has an associated frequency and duty cycle. The startup control signals are generated based upon default parameters, e.g., frequency, duty cycle and, possibly, time offsets between waveforms. These default parameters may be hard-coded within the primary side driver or they may be configurable.

External control signals are monitored 1030 to determine if there is any activity on them. These external control signals are typically generated by a secondary side controller within a power converter, and then provided to the primary side driver circuit 920 once the steady-state operating phase begins. Prior to the steady-state operating phase (e.g., in a startup operating phase), the external control signals are not being provided to the primary side driver circuit 920. Determining whether the primary side driver circuit is in the startup or steady-state operating phase is accomplished by detecting whether there is activity 1040 on the external control signals. For example, if none of the external control signals rise above a voltage threshold (e.g., 1 V) for a predetermined period of time (e.g., 100 ms), it is determined that the external control signals are not active.

Responsive to determining that the external control signals are not active, the primary side driver provides control signals for primary side switch devices based upon the generated startup control signals 1050. Operation then proceeds to continue monitoring the external control signals 1030 in order to detect when activity is detected 1040. The generated startup control signals continue to be used until activity is detected on the external control signals.

Responsive to determining that the external control signals are active, the primary side driver provides control signals for primary side switch devices based upon the external control signals 1060. Additionally, because the generated startup control signals are not needed when the external control signals are active, generation of the startup control signals may be disabled 1070. (This step is shown as optional in FIG. 10.)

Generally during the steady-state operating phase, use of the external control signals continues until the primary side driver circuit, and an associated power converter, are powered down. However, errors or configuration changes on a secondary side controller may lead to situations in which the startup operating phase needs to be entered again. This can be detected by continuing to monitor the external control signals even after the steady-state operating phase is entered. Such continued monitoring is not shown in FIG. 10, but would be accomplished by passing control to step 1030 after step 1060 or 1070.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switched-mode power converter circuit using an isolated topology for converting power from an input source into power for an output load, the switched-mode power converter circuit comprising:
    a transformer comprising a primary side winding and one or more secondary side windings;
    one or more primary side switch devices electrically connected to the primary side winding;
    a secondary side controller circuit coupled to one or more of the secondary side windings and configured to control switching of the one or more primary side switch devices during a steady-state operating phase in which the secondary side controller circuit is fully powered and operational;
    a primary side startup circuit configured to control switching of the one or more primary side switch devices during a startup operating phase in which the secondary side controller circuit is not controlling the switching of the one or more primary side switch devices, so as to energize the primary side winding during the startup operating phase; and
    a secondary side auxiliary power supply circuit galvanically isolated from the primary side winding and configured to supply power to the secondary side controller circuit based on energy transferred from the primary side winding during the startup operating phase.

2. The switched-mode power converter circuit of claim 1, further comprising:
    a primary side determining circuit configured to determine whether the switched-mode power converter is operating in the steady-state operating phase by sensing activity on control signals that are generated by the secondary side controller circuit to control switching of the one or more primary side switch devices.

3. The switched-mode power converter circuit of claim 1, further comprising:
    a primary side detection circuit configured to detect whether a voltage level of the input source is higher than a threshold,
    wherein the primary side startup circuit is further configured to begin generation of startup control signals that control switching of the one or more primary side switch devices in response to the primary side detection circuit detecting that the voltage level is higher than the threshold.

4. The switched-mode power converter circuit of claim 1, wherein the one or more primary side switch devices are controlled by control signals that are pulse-width modulated (PWM) waveforms, each of which is characterized by at least a frequency and a duty cycle.

5. The switched-mode power converter circuit of claim 4, wherein the secondary side controller circuit is further configured to generate the frequency and duty cycle for each of the PWM waveforms based upon a voltage sense signal input to the secondary side controller, the voltage sense signal being based upon a voltage at the output load of the switched-mode power converter.

6. The switched-mode power converter circuit of claim 1, further comprising:
    one or more secondary side switch devices configured to rectify a voltage provided to the output load of the switched-mode power converter circuit,
    wherein the secondary side controller circuit is further configured to output rectification control signals that control the one or more secondary side switch devices.

7. The switched-mode power converter circuit of claim 6, wherein the secondary side auxiliary power supply circuit is further configured to supply power to one or more rectification driver circuits, wherein each of the rectification driver circuits has an output controlling one of the secondary side switch devices, and an input controlled by one of the output rectification control signals.

8. The switched-mode power converter circuit of claim 1, wherein the transformer comprises two or more secondary side windings including an auxiliary winding, and wherein the secondary side auxiliary power supply circuit is coupled to the auxiliary winding such that the auxiliary winding provides power to the auxiliary power supply circuit during the startup operating phase, and the output load is coupled to one or more of the secondary side windings that are distinct from the auxiliary winding.

9. The switched-mode power converter circuit of claim 8, wherein the secondary side auxiliary power supply circuit is further configured to switch from being provided input power from the auxiliary winding during the startup operating phase to being provided power by one or more of the secondary side windings that are coupled to the output load during the steady-state operating phase.

10. The switched-mode power converter circuit of claim 1, wherein a power input for the secondary side auxiliary power supply circuit is supplied by a first of the one or more secondary side windings, and wherein the first of the one or more secondary side windings also supplies power to the output load.

11. The switched-mode power converter circuit of claim 1, further comprising:
   a control signal isolation circuit that inputs control signals from the secondary side controller circuit, and that outputs control signals that are used to control the one or more primary side switch devices.

12. The switched-mode power converter circuit of claim 1, wherein the switched mode power converter circuit is configured in one of a half-bridge topology, a full-bridge topology, an active clamp forward topology, and a push-pull topology.

* * * * *